United States Patent

Hummel

[11] 3,904,278
[45] Sept. 9, 1975

[54] PLASTIC LENS MOUNTING FOR OPTICAL SYSTEM

[75] Inventor: Lothar Hummel, Gottingen, Germany

[73] Assignee: ISCO Optische Werke GmbH, Gottingen, Germany

[22] Filed: Nov. 12, 1973

[21] Appl. No.: 414,827

[30] Foreign Application Priority Data
Nov. 10, 1972  Germany............................ 2254954

[52] U.S. Cl.................................. 350/255; 350/247
[51] Int. Cl.² ......................................... G02B 7/02
[58] Field of Search ............ 350/226, 247, 255, 252, 350/256, 257, 253

[56] References Cited
UNITED STATES PATENTS

| | | | |
|---|---|---|---|
| 2,407,511 | 9/1946 | Peck | 350/255 |
| 3,558,218 | 1/1971 | Grey | 350/226 |
| 3,578,847 | 5/1971 | Grey | 350/255 |
| 3,625,596 | 12/1971 | Lange et al. | 350/255 |

FOREIGN PATENTS OR APPLICATIONS
1,072,439  6/1967  United Kingdom................. 350/252

Primary Examiner—Robert J. Corcoran
Assistant Examiner—Wm. H. Punter
Attorney, Agent, or Firm—Karl F. Ross; Herbert Dubno

[57] ABSTRACT

A mounting for several lenses of an optical objective comprises a unitary, generally cylindrical body of mat-black plastic material forming an outer shell and at least two coaxial inner rings interconnected by narrow annular bridges and otherwise spaced apart by annular clearances, the rings and the shell having roughly the same wall thickness. The rings have end faces forming seats for the lenses whereas the shell has its outer peripheral surface helically grooved for threading into an objective holder. The front end of the shell has a ribbed flange, also separated from the shell by an annular clearance, which facilitates its rotation relative to the holder.

14 Claims, 1 Drawing Figure

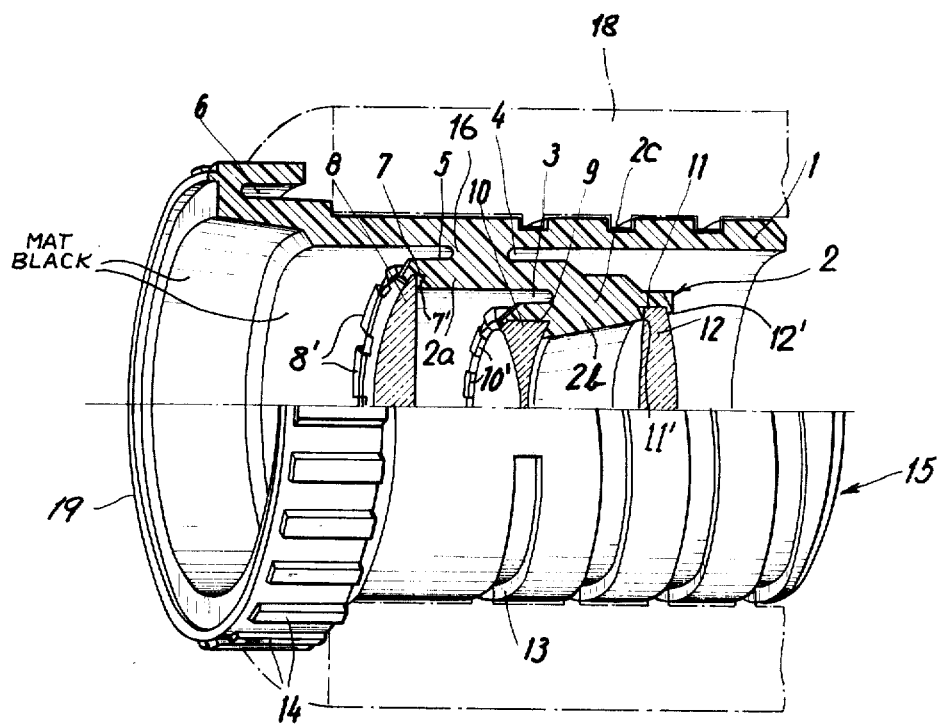

PLASTIC LENS MOUNTING FOR OPTICAL SYSTEM

FIELD OF THE INVENTION

My present invention relates to a mounting for a plurality of lenses in a projection objective or other optical system.

BACKGROUND OF THE INVENTION

Since the lens diameter of multilens objectives are determined by optical considerations, it is generally not possible to mount these lenses in a unitary support such as a lens barrel capable of being fitted into an objective holder, such as the housing of a projector, with freedom of axial displacement for focusing purposes. This is particularly true with lens mountings molded or cast from plastic materials, inasmuch as the intricate shape of such a body entails widely different wall thicknesses which leads to uneven cooling of the casting and therefore to structural nonuniformity of the finished product. The conventional practice, therefore, has been to provide separate interfitted bodies, i.e. an inner body serving as a lens barrel and an outer body designed as a mounting for that lens barrel, the two nested bodies contacting each other only at axially spaced-apart locations; such an arrangement has been shown, for example, in German printed patent specification No. 1,921,218.

OBJECTS OF THE INVENTION

The general object of our present invention is to provide a unitary lens mounting of the character set forth, designed to be mass-produced from plastic material, which avoids the aforestated drawbacks while accommodating three or more lenses of an optical system.

A more particular object is to provide a lens mounting of this type which is lighttight and does not require a special finishing operation for the purpose of minimizing internal reflections

SUMMARY OF THE INVENTION

A lens mounting according to my invention comprises a unitary plastic body centered on an axis, this body including an outer shell and a tubular insert connected with that shell by a narrow annular bridge. Over the major part of its length, i.e. everywhere except at that bridge, the insert is separated from the shell by an annular clearance; the ends of the insert form a plurality of seats adapted to receive a corresponding number of lenses which may be held in position by conventional means such as a press fit with or without edge crimping, hot or cold sealing or adhesive bonding.

The insert may be further subdivided into a plurality of coaxial rings interconnected along a fraction of their axial length, these rings having axially projecting end portions which form the requisite number of lens seats. In the case of three lenses, for example, two rings could be joined together by a common end portion. In any case, the cantilevered mounting of the lenses on such projecting carriers allows them to be accurately aligned with one another, e.g. with the aid of shims wedged into the adjoining clearances, independently of the positioning of the unitary body in its holder. To vary the positioning of that body, the outer shell surface is advantageously provided with coupling formations such as the turns of a helical groove (or ridge) designed to engage mating formations in the objective holder, thus enabling focusing of the system by manual rotation of the body. Such rotation will be facilitated by the presence of a milled or knurled front flange on the body, this front flange being partly separated from the outer shell surface by an annular recess. Thanks to these radial separations, the principal subdivisions of the molded body can have roughly the same wall thickness over the greater part of their length, i.e. everywhere except at locations where they are joined to one another.

A body of this description can be readily shaped in such a way as to be producible by injection molding, with its outer peripheral groove formed by a rotatable mold portion on a conventional unscrewing attachment as described, for example, in U.S. Pat. No. 3,328,844. It is, of course, also possible to form the groove by machining after the body has been molded.

The annular bridges within the shell form light barriers blocking the passage of stray radiation. To minimize the reflection of light rays on the inner wall surfaces of the body, I prefer to use a black resin of mat or nonglossy appearance.

BRIEF DESCRIPTION OF THE DRAWING

The above and other features of my invention will now be described in detail hereinafter with reference to the accompanying drawing the sole FIGURE of which represents a perspective view, partly broken away, of a plastic lens mounting according to this invention.

SPECIFIC DESCRIPTION

The lens mounting shown in the drawing comprises a unitary body 15 of plastic material suitably pigmented to have a mat-black appearance. Body 15 comprises a generally cylindrical outer shell 1 and a tubular insert 2, the latter being connected with the shell by an annular bridge 16. This insert 2, in turn, subdivided into a pair of coaxial rings $2a$, $2b$ which are joined together at $2c$ over a fraction of their axial length, the common ring portion $2c$ extending rearwardly to form a seat 11 for a lens 12. Outer ring $2a$ also has a forwardly projecting portion forming a seat 7 for a lens 8; a similar portion of inner ring $2b$ forms a seat 9 for a lens 10. The three lenses are held in position by edge beads 8', 10' and 12', respectively. Lenses 8 and 12 rest against oppositely facing transverse annular shoulders 7', 11' of insert 2 overhung by the edge beads 8' and 12', respectively.

Annular clearances 4 and 5 on opposite sides of bridge 16 separate the insert 2 from the shell 1; a similar clearance 3 isolates the front part of ring $2b$, carrying the lens 10, from ring $2a$. The three lenses 8, 10 and 12 are thus independently shiftable in radial direction, within the limits of elastic deformability of their carriers, for precise optical alignment with the aid of, for example, wedge pieces driven into the clearances 3, 4 and 5.

The outer surface of shell 1 is formed with a helical groove 13 matingly engaged by a corresponding helical rib in a bore of an objective holder 18 indicated in dot-dash lines. A front flange 19 of shell 1, partly separated therefrom by an annular recess or clearance 6, carries ribs 14 to facilitate manual rotation of body 15 for the purpose of axially displacing the lens assembly 8, 10, 12 with reference to a film surface or the like in order to focus the system.

Certain parts of body 15, including the front flange 19 and the inner ring 2b, have tapered surfaces designed to facilitate the extraction of that body from a cavity formed by axially separable mold halves.

Thus, I have described a lens mounting adapted to be produced in a single molding step and requiring no additional hardware (with the possible exception of centering shims) for satisfactory operation. It will be evident that the disclosed principles can be further extended by providing the insert 2 with additional lens seats spacedly nested within the lens carriers shown in the drawing and axially staggered with reference thereto.

I claim:

1. A lens mounting for an optical system, comprising a unitary body of plastic material centered on an axis, said body including an outer shell and a tubular insert connected with said shell by a narrow annular bridge, said insert being separated over a major part of its length from said shell by an annular clearance and being subdivided into a plurality of coaxial rings interconnected along a fraction of their axial length, said rings having together et least three axially projecting end portions forming respective lens seats.

2. A lens mounting as defined in claim 1 wherein said plastic material is a black resin with a mat appearance at least on the inner surface of said body.

3. A lens mounting as defined in claim 1 wherein said shell is provided on its outer peripheral surface with coupling formations engageable with an external objective holder.

4. A lens mounting as defined in claim 3 wherein said coupling formations are turns of a helical groove.

5. A lens mounting as defined in claim 4 wherein said shell has a peripheral front flange provided with gripping formations for facilitating manual rotation of said body.

6. A lens mounting as defined in claim 1 wherein said end portions are overhung by edge beads for engaging respective lenses.

7. In combination, a lens mounting as defined in claim 1 and at least three lenses respectively secured to said lens seats.

8. The combination as defined in claim 7, further comprising an objective holder with a bore receiving said body.

9. A lens mounting for an optical system, comprising a unitary body of plastic material centered on an axis, said body including an outer shell and a tubular insert connected with said shell by a narrow annular bridge, said insert being separated over a major part of its length from said shell by an annular clearance and having ends forming a plurality of axially staggered lens seats, said shell being provided on its outer peripheral surface with a helical groove forming turns engageable with threads on an external objective holder, said shell further having a peripheral front flange provided with gripping formations for facilitating manual rotation of said body.

10. A lens mounting as defined in claim 9 wherein said flange is partly separated from the outer shell surface by an annular recess.

11. A lens mounting as defined in claim 10 wherein said shell, said flange and said insert have roughly the same wall thickness over the greater part of their length.

12. A lens mounting as defined in claim 9 wherein said ends are overhung by edge beads for engaging respective lenses.

13. In combination, a lens mounting as defined in claim 9 and a plurality of lenses respectively secured to said lens seats.

14. The combination defined in claim 13, further comprising an objective holder with a bore receiving said body.

* * * * *